(12) United States Patent
Lee (10) Patent No.: US 8,574,384 B1
(45) Date of Patent: Nov. 5, 2013

(54) TAGS FOR THE SORTING OF PLASTICS

(75) Inventor: Kwangyeol Lee, Bellevue, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/702,013

(22) PCT Filed: Jul. 16, 2012

(86) PCT No.: PCT/US2012/046864
§ 371 (c)(1),
(2), (4) Date: Dec. 19, 2012

(51) Int. Cl.
*B32B 41/00* (2006.01)

(52) U.S. Cl.
USPC ............... 156/64; 156/378; 156/379; 209/3.3

(58) Field of Classification Search
USPC .............................. 156/64, 378, 379; 209/3.3
See application file for complete search history.

(56) References Cited

U.S. PATENT DOCUMENTS

| | | |
|---|---|---|
| 5,141,110 A | 8/1992 | Trischan et al. |
| 5,201,921 A | 4/1993 | Luttermann et al. |
| 7,126,755 B2 | 10/2006 | Moon et al. |
| 7,341,189 B2 | 3/2008 | Mossberg et al. |
| 2009/0069453 A1 | 3/2009 | Hasegawa et al. |
| 2009/0200212 A1 | 8/2009 | Hachin et al. |
| 2010/0078362 A1 | 4/2010 | Riise et al. |

OTHER PUBLICATIONS

International Search Report and Written Opinion for PCT/US2012/046864 dated Oct. 12, 2012.
American Chemistry Council: Plastics, http://plastics.americanchemistry.com/?css=print, (Printed from Internet Nov. 12, 2012).
MG Chemicals: Label and Adhesive Remover, http://www.mgchemicals.com/products/cleaners/specialty-cleaners/label-and-adhesive-remover-8361, (Printed from Internet Nov. 12, 2012).
Ogawa et al., Fabrication of Novel Layer-by-Layer Assembly Films Composed of Poly(lactic acid) and Polylysine through Cation-Dipole Interactions, *Langmuir* (Jul. 3, 2008), 24(16):8606-8609 (Abstract).

*Primary Examiner* — Yogendra Gupta
*Assistant Examiner* — Joshel Rivera
(74) *Attorney, Agent, or Firm* — Pepper Hamilton LLP (57) ABSTRACT

Methods and systems for identifying and sorting of different plastics rely on the differences in the surface polarity of the various plastics. A marking system may be used which provides markers that adhere specifically to only one type of plastic, and the adhering markers may then allow for a positive identification of the plastic. This type of system may be used for the identification and separation of polylactic acid plastics from various other plastics.

28 Claims, 3 Drawing Sheets

TAGS FOR THE SORTING OF PLASTICS

CLAIM OF PRIORITY

This application is a U.S. national stage filing under 35 U.S.C. §371 of International Application No. PCT/US2012/46864, filed 16 Jul. 2012 entitled "Tags for the Sorting of Plastics," the disclosure of which is incorporated by reference in its entirety.

BACKGROUND

Plastics are typically organic polymers of high molecular mass, but often contain other substances as well. The use of plastic expanded rapidly through the 20th century as the quality of plastics improved. Plastics are lightweight, flexible, and sturdy and can be used as a replacement for wood, metal and glass. Plastics, however, also have negative aspects. Toxic chemicals, such as benzene and dioxin, may be released into surrounding communities during the manufacture of certain types of plastic, and some types of plastics leach chemicals as they are being used. In addition, a plastic bottle tossed into a landfill may take hundreds of years to break down. Plastic bags that litter the landscape may harm animals that try to eat them, and may harm aquatic life when deposited into bodies of water.

Concerns over the environmental impact, health issues, and the rising price and supply of petroleum, have encouraged the use and development of bioplastics synthesized from corn, soy, sugar cane, and other crops. Bioplastics are now being used in deli and food containers, cups, bottles, plates and have also been used for automotive parts. Most of the bioplastic that is now being produced is polymerized lactic acid (PLA). PLA production releases fewer toxic substances than making petroleum plastic and uses less energy. It has been estimated that about two-thirds less greenhouse gas is produced during production. And PLA plastic can be composted, incinerated or recycled. PLA biodegrades relatively quickly under the right conditions, and can also repeatedly be recycled into more of the same product.

In a waste stream however, PLA plastics cannot be recycled with the bulk of petroleum-based plastic, which are primarily polyethylene terephthalate (PET) and high density polyethylene (HDPE) plastics. Even very small amounts of PLA impurity in PET or HDPE produced from recycling can lead to severe deterioration in the plastic properties. PLA plastics are similar in appearance to other plastics, and since PLA and PET bottles are similar in many other aspects such as density and transparency, the near infra-red (NIR) based sorting techniques used by a large majority of recycling processors are of only minimal utility. The inclusion of PLA bottles is also considered to take away value in the PET recycle stream by creating problems with sorting efficiency, accuracy, and potential yield loss. Better systems for identifying and sorting of plastics are therefore needed.

SUMMARY

Presently disclosed are methods for distinguishing and sorting different plastic materials based on adhesion to the plastic materials.

In an embodiment, a method for distinguishing at least one first plastic material from at least one second plastic material includes providing at least one marker having a greater affinity for adherence to the first plastic material than to the second plastic material, contacting the first plastic material and the second plastic material with the marker, and adhering the marker to substantially only the first plastic material and not the second plastic material.

In an additional embodiment, a method for sorting at least one first plastic material from at least one second plastic material in a mixture of plastic materials includes providing at least one marker having a greater affinity for adherence to the first plastic material than to the second plastic material, contacting the first plastic material and second plastic material with at least one marker, adhering at least one marker to substantially only the first plastic material and not to the second plastic material, and separating the first plastic material having at least one adhered marker from the mixture.

In a further embodiment, a marker for distinguishing plastic materials of different polymeric compositions has a strong affinity for adherence to at least one first polymeric composition and a weak affinity for adherence to at least one second polymeric composition.

In one additional embodiment, a method for applying a marker to at least one first plastic material of a mixture of plastic materials is disclosed, wherein the mixture of plastic materials includes the at least one first plastic material and at least one second plastic material, the marker has a strong affinity for adherence to substantially only the first plastic material and a weak affinity for adherence to the second plastic material, and the method includes contacting the first and second plastic materials and at least one marker; and adhering the at least one marker to substantially only the first plastic material and not to the second plastic material.

DETAILED DESCRIPTION

Near infra-red (NIR) sorting systems have been used to process recyclable materials. Most modern sorting systems where paper, plastics or other recyclable materials can be sorted, cannot be run economically without near infra-red technology. The basic principle behind NIR technology is measuring the reflectivity of an object within a wavelength range of 1100 to 2100 nm. In this wavelength range, materials such as plastics, paper, and textiles have their own specific characteristics. This range of wavelengths is not visible to the human eye, and requires optical sorting equipment. NIR is efficient for sorting of plastics such as PET, polypropylene (PP), polystyrene (PS), expandable polystyrene (EPS), polycarbonates (PC), poly vinyl chloride (PVC) as well as clearly identifying cellulose-based materials such as paper, card, cardboard or wood and natural fibers. PLA, however, may not be separated efficiently using such a system because of its many similarities to other plastics.

However, one characteristic for which a notable difference exists between PET and PLA is the surface polarity. Polarity is a physical property of compounds which relates other physical properties such as melting and boiling points, solubility, and intermolecular interactions between molecules. Polarity results from the uneven partial charge distribution between various atoms in a compound. Atoms, such as nitrogen, oxygen, and halogens, which are more electronegative, have a tendency to have partial negative charges. Atoms, such as carbon and hydrogen, have a tendency to be more neutral or have partial positive charges.

Electrons in a polar covalent bond are unequally shared between the two bonded atoms, which results in partial positive and negative charges. The separation of the partial charges creates a dipole. A polar molecule results when a molecule contains polar bonds in an asymmetrical arrangement. Nonpolar molecules may be of two types, molecules whose atoms have equal or nearly equal electronegativities with zero or very small dipole moments, or molecules which have polar bonds but symmetrical molecular geometry in which the bond dipoles cancel each other.

PET has a regular repeating structure as shown:

and exhibits non-polar properties because of the non-polar aromatic groups.

PLA however has the regular repeating structure:

and, since it has no aromatic groups, is a more polar molecule.

The difference in polarity between substances provides for differences in attraction between various substances. Polar molecules, as a result of having opposing positive and negative poles, may have an affinity for electrostatic attraction to other electrically charged ions or molecules, while non-polar molecules will not show the same attractive features. In other words, positively charged regions may attract negatively charged particles, and negatively charged regions may attract positively charged particles. Electrostatic bonds may then form and hold the components together.

Such differences in polarity between plastics may therefore be usable for distinguishing one plastic material from another. For this purpose, a marker may be provided which has a greater affinity for adherence to one plastic material than it has for another plastic material. When contact is provided between the marker and the various plastic materials, the marker may adhere to substantially only one of the plastic materials and not the other. The plastics may then be distinguished from one another based on whether or not they have an adhering marker.

For example, when one of the plastics has a first polarity, either polar or non-polar, and the other plastic has a different second polarity, a marker may be chosen which has a polarity similar to the first polarity and substantially different from the second polarity, so that the marker will adhere to only the plastic having the first polarity. The plastics may then be sorted into appropriate waste streams for additional processing based on whether or not they have an adhering marker.

Figure 1:
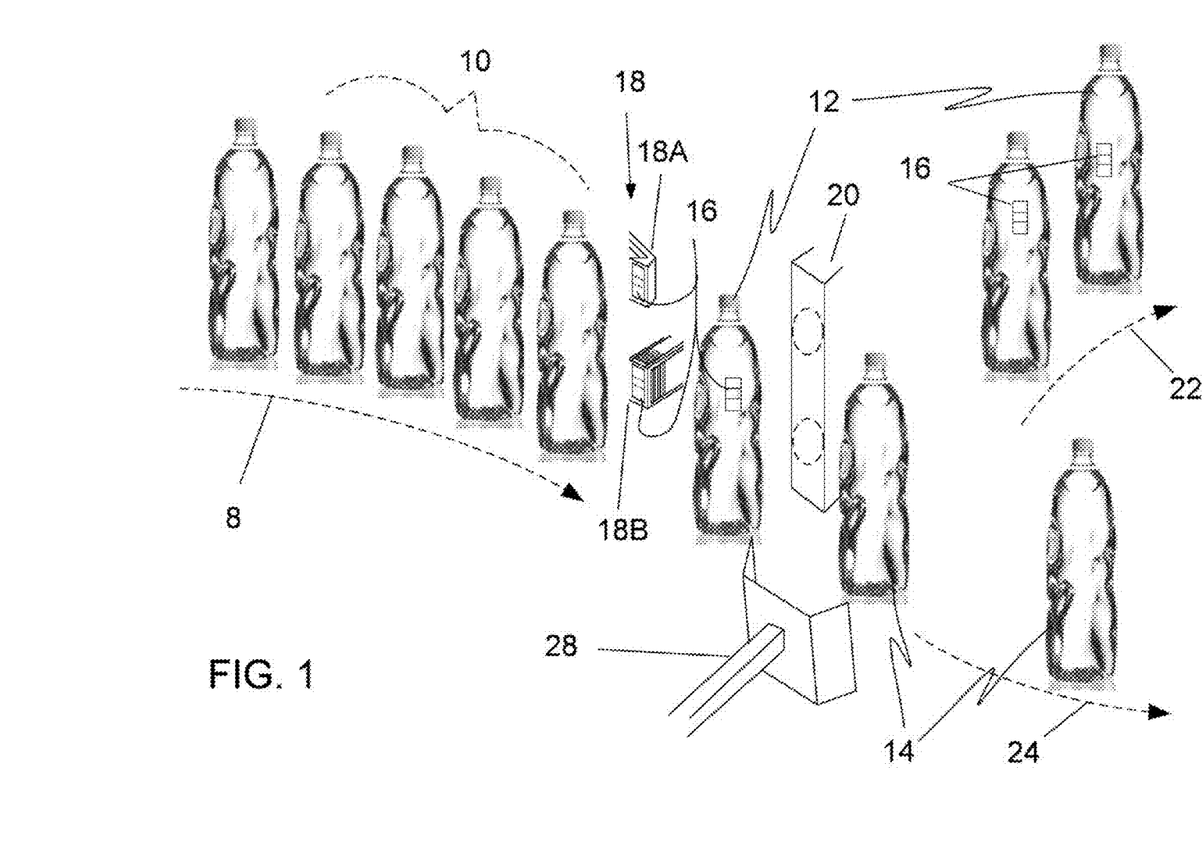
FIG. 1 depicts an illustrative system for marking and sorting plastic components according to an embodiment.

One example of such a system may be depicted by the illustration in FIG. 1 in which a mixture 10 of plastic bottles is to be sorted. Bottles are shown only as representative plastics as the plastics may be any type of plastic products, such as bags, bowls, containers, cups etc. The mixture 10 of plastic bottles may include bottles 12 made from as first plastic which has a first polarity, and bottles 14 made from a second plastic having a different polarity. Markers 16 configured to have a polarity similar to that of the bottles 12 may be provided by a marking station 18. Contact between bottles 12 and 14 and markers 16 may be conducted at the marking station 18, wherein markers will adhere to only bottles 12 and not bottles 14. A detection and sorting station 20 may be provided to sort the bottles 12 into a first waste stream 22 and the bottles 14 into a second waste stream 24.

In a similar manner, the mixture 10 may include more than two types of plastics, and the process may be used to sort one plastic of one polarity from at least two other plastics having different polarities. Alternatively, more than one plastic having the first polarity may be separated from several other plastics having the second polarity. If the separated streams 22 and 24 still include more than one type of plastic, an alternate separations step, such as NIR may be used to provide additional separation.

In one embodiment, the plastic 12, which is to be separated from a mixture 10 of other plastic materials, may be a polar polymer composition, and the other plastics 14 may be non-polar polymer compositions. The polar polymer composition may be aliphatic polyester. In an additional embodiment, the polar polymer composition may be PLA.

In an embodiment wherein the plastic 12 is a polar polymer composition having an anionic charge, the marker 16 may contain a cationic material to provide the adhesive attraction. Cationic polymers are polymers having positively charged macromolecules and an equivalent amount of counter-anions. If a substantial fraction of constitutional units of the polymer carry positive charges, then a cationic polymer is a polyelectrolyte. In such polymers, the positive charges may be fixed on groups located in main chains, as in, for example, an ionene or pendant groups. Some examples of cationic materials include poly-amino acids, chitosan or polyethylenimine, all of which have exposed, and positively charged amino groups.

chitosan polyethylenimine

One example of a poly-amino acid which may be incorporated into the markers 16 is poly-L-lysine.

ε-Poly-L-lysine

Poly-L-lysine (ε-poly-L-lysine or EPL) is a small natural homopolymer of the essential amino acid L-lysine that is produced by bacterial fermentation. EPL is used as a natural preservative in food products. EPL is a homo-polypeptide of approximately 25 to 30 L-lysine residues. The epsilon (ε) refers to the linkage of the lysine molecules. In contrast to normal peptide bonds that are linked by the alpha-carbon group, the lysine amino acids are molecularly linked by the epsilon amino group and the carboxyl group. EPL contains a positively charged hydrophilic amino group.

Figure 2:
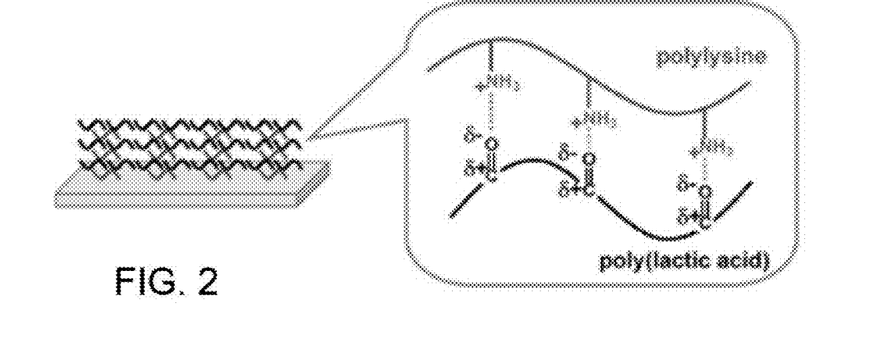
FIG. 2 depicts the charge-dipole interaction between polylactic acid and polylysine according to an embodiment.

It is this positively charged group which provides the ability for EPL to be used in a marker for the polar plastics. The oxygens of PLA provide areas of negative charge which attract the positively charged amino groups of EPL. This charge-dipole interaction of EPL and DLA is illustrated in FIG. 2. PET, as well as other non-polar plastics, such as HDPE, may not show such an interaction, as there will be substantially no affinity for adherence between PET and EPL.

Figure 3:
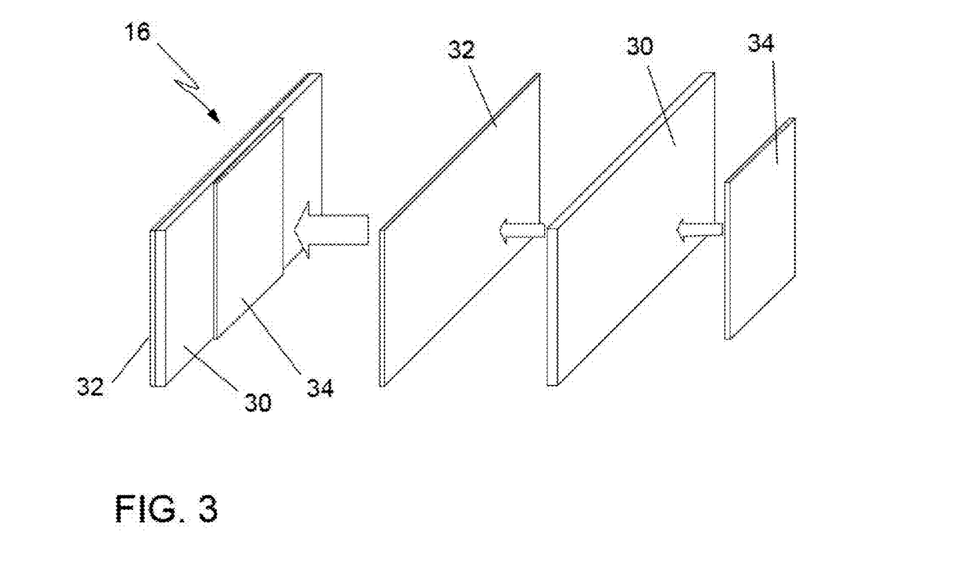
FIG. 3 depicts an illustrative marker label for use in the sorting of plastics according to an embodiment.

One example of a type of marker 16 may be an adhesive label such as shown in FIG. 3 and discussed further below. Alternatively, the marker 16 may be configured as spheres or capsules having an adhesive component on the outer surface. In one embodiment, as depicted by FIG. 3, the marker 16 may be formed from a material 30 which has adhesive components 32 and 34 on at least a portion of the surfaces of the marker. The adhesive components 32 and 34 may be different components, or they may be the same component. The components 32 and 34 will have a polarity similar to the polarity of the plastic to which the marker 16 is to adhere. For example, if the plastic is a polar plastic having exposed anionic regions, such as PLA, the adhesive components 32 and 34 may be polar substances with exposed cationic regions, such as poly-amino acids, chitosan or polyethylenimine.

Once adhered to a plastic component, such as waste plastic products in a recycling stream, the marker 16 may provide a detectable device for distinguishing the plastics. In an embodiment where the marker 16 is a label adhered to a plastic component 12, the adhered label distinguishes that particular type of plastic material from other plastic components 14 to which the label did not adhere. A visible adhered marker 16 would permit a visual distinction between plastics, and would allow for at least hand-sorting to be used to separate the plastics.

However, because of the volume of plastics which typically would need to be sorted at a sorting facility, manual application, visual distinction and hand sorting would not be very practical. For this reason, the marker 16 may be configured to include some other type of detectable component which can be identified in an automated process. Some examples of such detectable components include, but are not limited to metal substances, magnetic substances, fluorescent molecules, dyes, radio frequency emitters, reflective coatings, reflective gratings, substances that emit infrared waves, or combinations thereof. With reference to FIG. 3, these detectable components may be incorporated into the material 30.

Additional detection and sorting equipment 20 (shown only schematically) may then be provided in the waste recycling facilities to sort the plastic materials. In such facilities, the method for sorting at least one first plastic material 12 from at least one second plastic material 14 in a mixture of plastic materials 10, may include contacting the first plastic material 12 and second plastic material 14 with at least one marker 16, wherein the marker may have a greater affinity for adherence to the first plastic material than to the second plastic material. The markers 16 will adhere to substantially only the first plastic material 12 and not to the second plastic material 14, making it possible to separate the first plastic material having at least one adhered marker from the mixture.

A detection and sorting system 20 may be provided for determining whether a plastic has an adhered marker 16. The system 20, after checking for an adhered marker 16, may then separate any plastics 12 having an adhered marker from any plastics 14 which do not have an adhered marker. The markers 16 may include any type of detectable component, as discussed previously, and the detection and sorting system 20 may then be any type of compatible detection system for detecting the specific type of incorporated detectable component.

Some examples of systems which may be usable for detection of the markers 16 include, but are not limited to optical imaging systems using fluorescence, magnetic sorting systems, terahertz imaging systems, NIR systems, or combinations thereof.

In an embodiment, a terahertz imaging system may be used for scanning the plastics after the marking stage. Terahertz waves usually travel in line of sight. Terahertz radiation is non-ionizing sub-millimeter microwave radiation and shares with microwaves the capability to penetrate a wide variety of non-conducting materials. Terahertz radiation can pass through clothing, paper, cardboard, wood, masonry, plastic and ceramics, but cannot penetrate metal or water. Since terahertz radiation does not pass through metals, a metal may be incorporated into the markers to make the markers visible in an imaging system using terahertz radiation. Some examples of low-cost metals which may be used include aluminum, iron, steel and zinc.

In an alternate embodiment, fluorescence activated sorting may be used wherein the markers may incorporate a fluorescing material such as derivatives of fluorescein or rhodamine. A fluorescence measuring station may then be provided for the plastics to pass through, and the plastics could be sorted based on the presence or absence of a detected fluorescence.

In another embodiment, magnetic sorting may be used wherein the markers incorporate a ferromagnetic material, such as iron. A sorting station may then be provided which sorts the marked plastics by means of magnetic attraction.

TO reduce material costs, the markers 16 may also be configured to be removable from the plastics after the plastics have been sorted so that the marker may then be re-usable for sorting of additional plastics. To remove the markers 16, the plastic material 12 and adhered marker may be contacted with a surfactant that will break the adhesion of the marker to the plastic material. As an example, the plastic 12 and adhered marker 16 could be sprayed with a surfactant for a specified period of time that was sufficient to allow for breaking of the adhesion. If EPL is used in the adhesive, a slightly acidic solution, such as dilute acetic acid may be used for removal of the markers. Such a solution may be, for example, from about 1% to about 10% acetic acid by volume. In an embodiment, vinegar, typically about 4% to about 8% acetic acid by volume, would be usable for releasing the markers 16.

One possible configuration of markers 16 may include components, such as spheres or capsules which may be dispersable onto the mixture 10 of plastic components. The plastic components may be transported on a conveyor assembly to pass under a dispersion system. The markers 16 may be released to fall into contact with the plastics, wherein plastics 12 of a composition to which the markers will adhere will retain at least one marker while alternate plastics 14 will not retain a marker. The conveyor may be of an open screen type construction having openings of a size large enough to enable un-adhered markers 16 to fall though while retaining the plastics 12, 14 thereon. Any markers 16 which fall through the arrangement without adhering to a plastic may be collected for re-dispersal.

Alternatively, and as schematically illustrated in FIG. 1, the markers 16, as labels, may be presented individually to the plastic components 12 and 14 as a plastic component passes through a marking station 18. The marking station 18 may have a movable arm 18A which picks up individual markers 16 from a supply (not shown) and moves the markers into contact with the plastic component 12 or 14 retained in a designated holding location. Alternatively, the marking station may have a dispensing device 18B which retains a supply of markers 16, and either the device 18B may be moved into contact with the plastic component 12, 14 at a designated location, or the plastic component may be moved into contact with the dispensing device. The station 18 may include more than one of each type of dispensing device 18A, 18B, may include a combination of the dispensing devices, or may have alternate types of dispensing systems.

As shown in FIG. 3, the marker 16 may be formed from a substrate material 30 which may be the same material as the plastic that is to be identified and sorted. The substrate 30 may have an amount of adhesive 32 and 34 on each of its surfaces. One of the surfaces may have a first adhesive 32 thereon which has a strong affinity for adherence to substantially only the plastic material 12 which is to be sorted from the mixture 10, and a weak affinity for adherence to the other plastic material 14. The other surface may have a second adhesive 34 thereon, and each marker 16 may be provided on a carrier device 40, as shown in FIG. 3A, with the second surface of the marker adhesively retained on the carrier by the second adhesive. In an embodiment, the adhesives 32 and 34 may be the same adhesive.

Figure 4A:
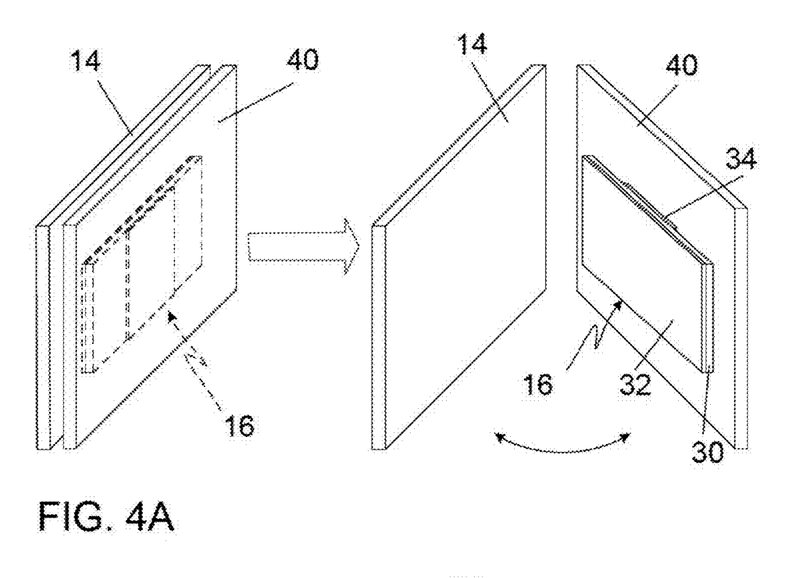
FIGS. 4A and 4B depict illustrations of a method for applying a marker to plastic materials according to an embodiment.
Figure 4B:
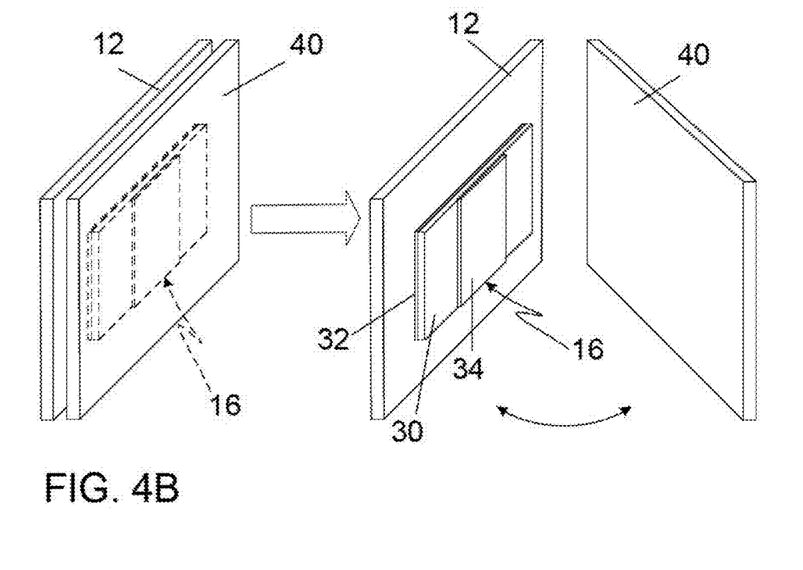

The carrier device 40 may be a part of the dispensing system 18 of FIG. 1 and may provide contact between a plastic 12, 14 and the adhesive 32 on the marker 16. With reference to FIG. 4B, the adhesives 32 and 34 may be configured such that the adhesive interaction of the adhesive 32 to the plastic 12 is stronger than the adhesive interaction of the adhesive 34 and the carrier 40 so that the marker 16 will adhere to the plastic 12 and move off of the carrier when contact is made with the plastic 12. On the other hand, as shown in FIG. 4A, since the adhesive 34 will not have an affinity for adhering to the plastic 14, when contact occurs between the adhesive 34 and the plastic 14, the marker 16 will remain attached to the carrier 40 and will not transfer to the plastic 14.

In an embodiment as depicted in FIG. 3, the adhesives 32 and 34 may be the same adhesive, but the amount of adhesive on each side of the marker 16 may be different. The amount of the adhesive 32 may be about two times to about ten times the amount of the adhesive 34. The side of the marker 16 with the adhesive 32 will then a have a stronger binding affinity than the side with the adhesive 34 giving the marker the ability to transfer off of the carrier 40 when the marker contacts the plastic 12, yet remain on the carrier when the marker contacts the plastic 14.

With markers 16 as set forth in embodiments herein, specific types of plastics, such as PLA, may be selectively labeled and identified for sorting. Such markers 16 may be manually applied with hand-held dispensers or may alternatively by applied by automated equipment. Once adhered, a manual sorting may be performed. Alternatively, since the markers 16 may incorporate any of a wide variety of detectable components which can allow for sorting be a variety of methods, the sorting may be performed by machines. This variety of detection methods may also make it possible for improved sorting accuracy by enabling sorting facilities to customize markers depending on the types of plastics being sorted and the systems available for sorting. Further, since the plastics are not physically affected, a higher value reclamation may be attainable by the sorting facilities.

EXAMPLE 1

A System for Identifying Polylactic Acid Plastics in a Mixture of Plastics

Poly lactic acid (PLA) plastics, unlike polyethylene terephthalate (PET) plastics, have a chemical structure in which a plurality of bound oxygen atoms are laterally exposed. The oxygens of PLA provide areas of negative charge which are able to attract positively charged amino groups of cationic poly-amino acids, such as that of $\epsilon$-poly-L-lysine (EPL). This charge-dipole interaction will be used as a means for specifically attaching markers with an EPL content to PLA plastic and not to PET plastic in a system as represented by the illustration in FIG. 1.

A mixture 10 of plastic bottles of both PLA and PET plastics will be obtained, and a plurality of markers 16, in the form of labels, will be constructed as illustrated in FIG. 2. Sheets of PLA plastic will be cut into 3 cm by 5 cm portions to form the substrate 30 for markers 16. The 3×5 stock will have one surface completely coated with EPL to provide the adhesive component 32 and the other surface will have only a strip of EPL covering only about ½ of the surface as the adhesive component 34. The adhesive coated markers 16 will then be applied to a carrier 40 by means of the adhesive 34 in a manner as represented by the right-side element of FIG. 4A. The carrier 40 will be made of PLA. With this configuration, the areas of EPL coating on both sides will differ and the side with the larger area coated by EPL is exposed for contact with bottles from the mixture 10. The markers 16 will be stacked and provided in a dispensing device such as that represented by the device 18B.

At a dispensing station 18, bottles from the mixture 10 will be contacted with a marker 16 retained in the dispensing device 18B by means of the carrier 40. An illustration depicting contact is shown by the left-hand portions of FIGS. 3A and 3B. Contact will be maintained for about 3 seconds to allow sufficient time for adhesion of the marker 16 to a bottle to occur, and the bottle will be separated from the dispensing device 18B.

As illustrated by the right-hand portion of FIG. 4B, if the bottle is a PLA bottle 12, the marker 16 will transfer from the carrier 40 to the bottle 12 because of the difference in the areas of adhesives 32 and 34. (Since the carrier 40 and the bottle 12 are the same PLA plastic, the marker 16 will adhere more strongly by the side 32 having the larger adhesive content.) Alternatively, as shown in the right-hand portion of FIG. 4A, if the bottle is however a PET bottle 14, the marker 16 will stay on the carrier 40. In this manner, PLA bottles will be identifiable and distinguishable from PET bottles.

EXAMPLE 2

Automated Sorting of PLA Plastics from Other Plastics

The system as described in Example 1 will be used as a component in a sorting facility for sorting waste plastics. The PLA plastics will be one type of plastic in a mixture of several different kinds of plastics, including PET and HDPE. To allow for automated sorting, the markers 16, in the form of labels and having EPL on the surfaces thereof, will also be constructed to include fluorescein as a machine detectable component. A mixture 10 of assorted plastic components will be deposited in a collection bin (not shown) which will feed individual components of the mixture onto a conveyor system 8 in a manner as depicted by the bottles in FIG. 1.

The plastic components will individually pass through a marking system 18 of the type described in Example 1. When the plastic component is a PLA plastic 12, a marker 16 will transfer from the carrier 40 to the plastic 12, and when the plastic component is a type of plastic 14 of the several other plastics, the marker 16 will stay on the carrier 40. As the plastic components move out of the dispensing system 18, they will either have an adhering marker 16, indicating PLA plastic 12, or they will not have an adhering marker, indicating an alternate type of plastic 14, which would be any of the other types of plastics in the mixture 10.

The plastic components 12 and 14 will then be fed to a detection and sorting system 20. Since the markers 16 will have fluorescein incorporated into the construction, the detection and sorting system 20 will include an illumination sources for activating the fluorescence and a fluorescence detector. As the plastic components 12, 14 individually pass the fluorescence detector a signal will be generated in response to a detection of fluorescence, indicating the presence of a marker 16 and thus a PLA plastic 12. In response to the generated signal, a push arm 28 will be activated diverting the PLA plastic 12 into the waste stream 22. When no detection signal is generated, the plastic components 14 will be allowed to pass into the waste stream 24.

The plastic components 14 will not have any additional markers 16 attached thereto and will not require any additional processing steps for marker removal. The plastic components 14 will be processed for further separation and recycling. The waste stream 22 will include an additional wash station (not shown) in which the plastics 12 will be sprayed with a 4% by volume acetic acid solution to loosen the adhesive bond of the markers 16. The markers 16 will be collected, processed and prepared for re-use.

The components and processes as set forth herein provide for improved separation of different types of plastic materials, and in particular, PLA plastics from PET and HDPE plastics, and would be usable in waste sorting facilities.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having, at least," the term "includes" should be interpreted as "includes but is not limited to," etc). It will be further understood by those within the art that if a specific number of an introduced claim recitation is intended, such an intent will be explicitly recited in the claim and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one haying skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markus group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, of 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for distinguishing at least one first plastic material from at least one second plastic material, the method comprising:
   providing at least one marker having a greater affinity for adherence to the first plastic material than to the second plastic material;
   contacting the first plastic material and the second plastic material with the marker; and
   adhering the marker to substantially only the first plastic material and not the second plastic material.

2. The method of claim 1, wherein:
   the first plastic material has a first polarity, the second plastic material has a second polarity that differs from the first polarity;
   the marker comprises a material having a polarity similar to the first polarity and substantially different from the second polarity; and
   the marker has substantially no affinity for adherence to the second plastic material.

3. The method of claim 1, wherein the first plastic material comprises a polar polymer composition, the second plastic material comprises a non-polar polyester, and the marker comprises a cationic material.

4. The method of claim 1, wherein the first plastic material comprises an aliphatic polyester, and the marker comprises a poly-amino acid, chitosan, polyethylenimine or combinations thereof.

5. The method of claim 1, wherein the first plastic material comprises polylactic acid, and the marker comprises poly-L-lysine.

6. The method of claim 1, wherein the marker comprises a label, the label comprising:
   at least one component capable of being detected with a detection system; and
   an adhesive having an affinity for adherence to the first plastic material and not to the second plastic material.

7. The method of claim 1, wherein:
   the first plastic material comprises polylactic acid;
   the second plastic material comprises polyethylene terephthalate, high density polyethylene, or combinations thereof; and
   the marker comprises a label, the label comprising:
   at least one component capable of being detected with a detection system, the at least one component comprising a metal substance, a magnetic substance, a fluorescent molecule, a dye, a radio frequency emitter, a reflective coating, a reflective grating, a substance that emits infrared waves, or combinations thereof; and
   an adhesive comprising poly-L-lysine.

8. A method for sorting at least one first plastic material from at least one second plastic material in a mixture of plastic materials, the method comprising:
   providing at least one marker having a greater affinity for adherence to the first plastic material than to the second plastic material;
   contacting the first plastic material and second plastic material with at least one marker;
   adhering at least one marker to substantially only the first plastic material and not to the second plastic material; and
   separating the first plastic material having at least one adhered marker from the mixture.

9. The method of claim 8, further comprising:
   detecting the presence or absence of an adhered marker on the first plastic material and the second plastic material; and
   separating the first plastic material having an adhered marker from the second plastic material not having an adhered marker.

10. The method of claim 8, wherein the marker comprises at least one label comprising an adhesive material having the affinity for adherence to the first plastic material and not the second plastic material, and the adhering comprises:

providing a dispensing device for dispensing the label;
moving the first and second plastic material to the dispensing device; and
contacting the first and second plastic material and at least one dispensed label for a period of time sufficient to provide adherence of the label to the first plastic material and the second plastic material, wherein the label adheres to only the first plastic material and not to the second plastic material.

11. The method of claim 8, wherein:
the marker comprises at least one component capable of being detected with a detection system, the component comprising a metal substance, a magnetic substance, a fluorescent molecule, a dye, a radio frequency emitter, a reflective coating, a reflective grating, a substance that emits infrared waves, or combinations thereof; and
the method further comprises scanning the first and second plastic materials with the detection system to determine the presence or absence of at least one adhered marker.

12. The method of claim 8, wherein:
the first plastic material has a first polarity;
the second plastic material has a second polarity that differs from the first polarity; and
the marker comprises a material having a polarity similar to the polarity of the first plastic material and substantially different from the polarity of the second plastic material.

13. The method of claim 8, wherein:
the first plastic material comprises polylactic acid; and
the marker comprises poly-L-lysine for adherence to the polylactic acid.

14. The method of claim 8, wherein the marker comprises an adhesive material having a greater affinity for adherence to the first plastic material than to the second plastic material, and the contacting comprises at least one of:
a) dispersing the at least one marker onto the mixture of plastic materials, and
b) moving plastic material past a dispensing device and dispensing the at least one marker into contact with the plastic material.

15. The method of claim 8, further comprising:
removing the adhered marker from the first plastic material; and
re-using the marker for sorting of additional plastic materials by repeating at least the steps of contacting, adhering and separating.

16. The method of claim 8, further comprising removing the adhered marker from the first plastic material by contacting the adhered marker with a surfactant for a period of time sufficient to break the adhesion of the marker to the first plastic material.

17. A marker for distinguishing plastic materials of different polymeric compositions, the marker having a strong affinity for adherence to at least one first polymeric composition and a weak affinity for adherence to at least one second polymeric composition.

18. The marker of claim 17, wherein:
one of the first polymeric composition and second polymeric composition has a polarity substantially greater than the polarity of the other of the first polymeric composition and the second polymeric composition; and
the marker comprises a material having a polarity similar to the polarity of the first polymeric composition, and substantially different from the polarity of the second polymeric composition.

19. The marker of claim 17, wherein the first polymeric composition is an aliphatic polyester, the second polymeric composition is high density polyethylene, polyethylene terephthalate, or combinations thereof, and the marker comprises a poly-amino acid, chitosan, polyethylenimine or combinations thereof.

20. The marker of claim 17, wherein the first polymeric composition comprises polylactic acid, the second polymeric composition comprises a substantially non-polar polymer, and the marker comprises poly-L-lysine.

21. The marker of claim 17, wherein the marker comprises a label, the label comprising:
at least one component capable of being detected with a detection system, the component comprising a metal substance, a magnetic substance, a fluorescent molecule, a dye, a radio frequency emitter, a reflective coating, a reflective grating, a substance that emits infrared waves, or combinations thereof; and
an adhesive having a strong affinity for adherence to at least one first polymeric composition and a weak affinity for adherence to at least one second polymeric composition.

22. A method for applying a marker to at least one first plastic material of a mixture of plastic materials, wherein:
the mixture of plastic materials comprises the at least one first plastic material and at least one second plastic material;
the marker has a strong affinity for adherence to substantially only the first plastic material and a weak affinity for adherence to the second plastic material, and
the method comprises:
contacting the first and second plastic materials and at least one marker; and
adhering the at least one marker to substantially only the first plastic material and not to the second plastic material.

23. The method of claim 22, wherein:
the marker comprises at least one label having at least a first surface comprising an adhesive thereon;
the adhesive has the strong affinity for adherence to substantially only the first plastic material and the weak affinity for adherence to the second plastic material; and
the contacting comprises contacting the first and second plastic materials with the adhesive first surface of the label.

24. The method of claim 23, wherein the contacting further comprises:
moving at least one label into contact with the first and second plastic materials; and
adhering and transferring the label to the first plastic material and not to the second plastic material.

25. The method of claim 23, wherein:
each label has a second surface opposite the first surface;
the first surface comprises a first surface area having the adhesive thereon;
the second surface comprises a second surface area having the adhesive thereon, the first surface area being greater than the second surface area; and
the method further comprises providing each label on a carrier with the second surface of the label adhesively retained on the carrier by the second surface area of adhesive.

26. The method of claim 25, wherein:
the second surface area is between about 1/10 to about 1/2 of the first surface area; and
the carrier comprises a plastic material that is the same as the first plastic material for adhesively retaining the second side of the label onto the carrier; and
the method further comprises:
moving the at least one label retained on the carrier into contact with the selected plastic material; and one of:
adhering and transferring the label from the carrier to the selected plastic material when the selected plastic material is the first plastic material; and
retaining the label on the carrier when the selected plastic material is the second plastic material.

27. The method of claim 22, wherein:
the first plastic material comprises a polar polymer composition;
the second plastic material comprises a non-polar polymer composition; and
the marker comprises a cationic material.

28. The method of claim 22, wherein:
the first plastic material comprises polylactic acid;
the second plastic material comprises polyethylene terephthalate, high density polyethylene or combinations thereof; and
the marker comprises poly-L-lysine.

* * * * *

UNITED STATES PATENT AND TRADEMARK OFFICE
CERTIFICATE OF CORRECTION

| | | |
|---|---|---|
| PATENT NO. | : 8,574,384 B1 | Page 1 of 1 |
| APPLICATION NO. | : 13/702013 | |
| DATED | : November 5, 2013 | |
| INVENTOR(S) | : Lee | |

It is certified that error appears in the above-identified patent and that said Letters Patent is hereby corrected as shown below:

In the Specification

In Column 4, Line 2, delete "as first" and insert -- a first --, therefor.

In Column 6, Lines 66-67, delete "dispersable" and insert -- dispersible --, therefor.

In Column 10, Line 11, delete "those" and insert -- to those --, therefor.

In Column 10, Line 51, delete ""having," and insert -- "having --, therefor.

In Column 10, Line 55, delete "claim" and insert -- claim, --, therefor.

In Column 11, Line 18, delete "haying" and insert -- having --, therefor.

In Column 11, Line 34, delete "Markus" and insert -- Markush --, therefor.

In Column 11, Line 50, delete "1, 2, of 3 cells." and insert -- 1, 2, or 3 cells. --, therefor.

Signed and Sealed this
Fifteenth Day of April, 2014

Michelle K. Lee
*Deputy Director of the United States Patent and Trademark Office*